(12) United States Patent
Jogikalmath et al.

(10) Patent No.: US 9,273,432 B2
(45) Date of Patent: *Mar. 1, 2016

(54) VOLATILE DEBONDER FORMULATIONS FOR PAPERMAKING

(75) Inventors: Gangadhar Jogikalmath, Cambridge, MA (US); Lynn Reis, Arlington, MA (US); David S. Soane, Chestnut Hill, MA (US); Andrea Schneider, Hyde Park, MA (US)

(73) Assignee: NANOPAPER, LLC, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/428,216

(22) Filed: Mar. 23, 2012

(65) Prior Publication Data

US 2013/0068407 A1 Mar. 21, 2013

Related U.S. Application Data

(60) Provisional application No. 61/467,420, filed on Mar. 25, 2011.

(51) Int. Cl.
*D21H 21/22* (2006.01)
*D21H 17/06* (2006.01)
*D21H 23/04* (2006.01)
*D21H 23/28* (2006.01)
*C08K 5/06* (2006.01)

(52) U.S. Cl.
CPC ............... *D21H 23/04* (2013.01); *C08K 5/06* (2013.01); *D21H 17/06* (2013.01); *D21H 21/22* (2013.01); *D21H 23/28* (2013.01)

(58) Field of Classification Search
CPC ....... D21H 21/22; D21H 17/06; D21H 23/04; D21H 23/28; D21H 17/36; D21H 17/54; D21H 17/56; D21H 17/72; D21H 21/18
USPC ......... 162/158, 179, 183–185, 204, 207, 102, 162/183–18
See application file for complete search history.

(56) References Cited

U.S. PATENT DOCUMENTS

| | | | | |
|---|---|---|---|---|
| 3,607,486 A * | 9/1971 | Jacks et al. .................. 156/41 |
| 3,826,711 A * | 7/1974 | Schoggen et al. ............ 162/102 |
| 3,865,918 A | 2/1975 | Mitchell et al. |
| 4,144,122 A * | 3/1979 | Emanuelsson et al. ....... 162/158 |
| 4,208,301 A * | 6/1980 | Gammon ..................... 516/116 |
| 4,432,833 A | 2/1984 | Breese |
| 4,808,266 A * | 2/1989 | Faurie ......................... 162/102 |
| 5,137,768 A * | 8/1992 | Lin .............................. 428/116 |
| 5,674,832 A | 10/1997 | Keys |
| 5,753,079 A * | 5/1998 | Jenny et al. .................. 162/158 |
| 5,792,856 A * | 8/1998 | Allen et al. ..................... 536/66 |
| 5,853,542 A * | 12/1998 | Bottorff ..................... 162/168.2 |
| 5,858,173 A * | 1/1999 | Propst, Jr. .................. 162/164.1 |
| 5,873,979 A | 2/1999 | Naieni |
| 5,876,510 A | 3/1999 | Kuemin et al. |
| 5,994,530 A * | 11/1999 | Posey-Dowty et al. ......... 536/66 |
| 6,051,108 A * | 4/2000 | O'Neal, Jr. ................... 162/199 |
| 6,171,444 B1 * | 1/2001 | Nigam .......................... 162/158 |
| 6,201,060 B1 * | 3/2001 | Jansen et al. ................. 524/590 |
| 6,686,054 B2 * | 2/2004 | Nigam .......................... 428/511 |
| 6,969,443 B1 | 11/2005 | Kokko |
| 7,591,926 B2 * | 9/2009 | Becker et al. ................ 162/162 |
| 7,854,822 B2 | 12/2010 | Chmielewski et al. |
| 8,067,524 B2 * | 11/2011 | Kokko .......................... 528/271 |
| 8,747,615 B2 * | 6/2014 | Jogikalmath et al. ......... 162/158 |
| 2003/0024669 A1 | 2/2003 | Kokko |
| 2004/0035538 A1 * | 2/2004 | Kokko ........................... 162/158 |
| 2004/0144511 A1 | 7/2004 | McKay et al. |
| 2004/0182532 A1 * | 9/2004 | Becker et al. ................ 162/134 |
| 2006/0118258 A1 | 6/2006 | Chmielewski et al. |
| 2008/0294132 A1 * | 11/2008 | Tan et al. ....................... 604/360 |
| 2010/0042062 A1 | 2/2010 | Fernkvist et al. |
| 2012/0006499 A1 * | 1/2012 | Jogikalmath et al. ....... 162/164.3 |
| 2013/0068407 A1 * | 3/2013 | Jogikalmath et al. ......... 162/158 |
| 2013/0112361 A1 * | 5/2013 | Mikami et al. ................ 162/202 |
| 2013/0160958 A1 * | 6/2013 | Jogikalmath et al. ......... 162/161 |
| 2013/0248132 A1 * | 9/2013 | Jogikalmath et al. ......... 162/158 |
| 2014/0041819 A1 * | 2/2014 | Zhang et al. .................. 162/102 |
| 2015/0176214 A1 * | 6/2015 | Jogikalmath ........... D21H 17/72 162/164.6 |

FOREIGN PATENT DOCUMENTS

| | | | | |
|---|---|---|---|---|
| EP | 1013825 A1 | 6/2000 | | |
| GB | 721053 A | 5/1954 | | |
| WO | 94/05857 A1 | 3/1994 | | |
| WO | 01/31122 A1 | 5/2001 | | |
| WO | 2008069711 A1 | 6/2008 | | |
| WO | WO 2010080958 A1 * | 7/2010 | ............... D21C 9/00 |
| WO | WO 2012135001 A2 * | 10/2012 | | |
| WO | WO 2012135001 A3 * | 11/2012 | | |
| WO | WO 2013070884 A2 * | 5/2013 | | |

* cited by examiner

*Primary Examiner* — Jose Fortuna
(74) *Attorney, Agent, or Firm* — Elmore Patent Law Group, P.C.; Mahreen Chaudhry Hoda; Carolyn S. Elmore, Esq.

(57) ABSTRACT

Formulations and methods for papermaking use one or more volatile debonders, where the volatile debonder forms a solution or an emulsion with water in a paper precursor, and where the volatile debonder is evaporable from the paper precursor before the paper precursor is completely dried to form a paper sheet during papermaking. Two volatile debonders having different boiling points can be used, where they are miscible in water and in each other, and where one volatile debonder has a higher molecular weight and the other volatile debonder has a lower boiling point.

18 Claims, 13 Drawing Sheets

VOLATILE DEBONDER FORMULATIONS FOR PAPERMAKING

RELATED APPLICATION

This application claims the benefit of U.S. Provisional Application No. 61/467,420 filed Mar. 25, 2011. The entire teachings of the above application are incorporated herein by reference.

FIELD OF THE APPLICATION

This application relates generally to volatile debonders for defiberizing pulp boards.

BACKGROUND

Fast wicking for liquids is desirable in many commercial products such as diapers, personal hygiene, sanitary products etc. Fast wicking is typically achieved by converting paperboard products into defiberized fluff pulp that has a high surface area to enable fast wicking. Fluff pulp is then positioned within the product so that it can wick bodily fluids, for example, away from their point of deposition.

Fluff pulp is formed from paperboards made by conventional papermaking technologies. Once the paperboard sheet is manufactured, for example by a wet-laid process, it is defiberized mechanically, using a device like a hammermill. The defiberized fluff pulp can then be air-laid with particles of superabsorbent polymers or other super-absorbent materials. Such particles, capable of absorbing up to one hundred times their weight in water, are admixed with the defiberized fluff pulp to form the absorbent core for the product.

Formation of fluff pulp from paperboard typically uses mechanical means to break the strong intermolecular hydrogen bonds that form between neighboring cellulose fibers during the papermaking process. A significant amount of energy is required to overcome the strength of the intermolecular bonds and break a paperboard into individual fibers. Because the energy required for mechanical breakdown methods is expensive, alternate technologies have been employed to reduce the formation of hydrogen bonds during papermaking.

As an example, debonder compounds are used during papermaking for this purpose. Debonders bind to the fiber surface, preventing the formation of hydrogen bonds by acting as a spacer between neighboring cellulose molecules and fibers. A typical configuration for a debonder includes quaternary ammonium salts and a long hydrophobic chain. In such a debonder, the cationic ammonium group can attach the debonder molecule to the anionic fiber surface, while its hydrophobic chain acts as a spacer between cellulose fibers/molecules. With the debonder in place, fewer bonds form between the cellulose fibers. With fewer bonds holding the fibers together, less energy is required to break the fibers apart.

Although these debonders produce a paperboard that requires less mechanical energy for forming fluff pulp, the debonder and its hydrophobic moiety are retained within the paper product. Retention of the hydrophobic moiety in the final product can be undesirable. For example, the presence of the hydrophobic component decreases the wicking property of the resulting fluff pulp. Hence there is a need for an approach that reduces the hydrogen bonding among the cellulose fibers, so that they can be easily broken apart, but that does not affect the hydrophilic properties of the resulting fluff pulp. Desirably, an appropriate debonder would both decrease the energy of defiberization and maintain comparable or improved wicking speeds.

SUMMARY

Disclosed herein, in embodiments, are formulations for use in papermaking, comprising a volatile debonder, wherein the volatile debonder forms a solution or an emulsion with water in a paper precursor, and wherein the volatile debonder is evaporable from the paper precursor before the paper precursor is completely dried to form a paper sheet during papermaking. In embodiments, the volatile debonder can form an azeotropic mixture with water. The azeotropic mixture can be a positive azeotropic mixture. In embodiments, the volatile debonder can comprise a hydrophobic molecule. In embodiments, the volatile debonder can form an emulsion with water. In embodiments, the volatile debonder can comprise a molecule having a lower boiling point than a drying temperature to form the paper precursor into the paper sheet. In embodiments, the volatile debonder comprises a glycol ether, and the glycol ether can comprise at least one of an aliphatic and an aromatic side chain. Also disclosed herein are formulations for use in a process of papermaking, comprising a volatile debonder, wherein the volatile debonder is formulated in an aqueous solution or emulsion for dispersal on a paper precursor, and wherein the volatile debonder is evaporable from the paper precursor before the paper precursor is completely dried to form a paper sheet. In embodiments, the volatile debonder evaporates from the paper precursor without leaving residua in the paper sheet. The volatile debonder can be formulated in an aqueous solution or emulsion for dispersal by spraying on the paper precursor. In embodiments, the formulation further comprises a second volatile debonder that is evaporable from the paper precursor before the paper precursor is completely dried to form the paper sheet.

Also disclosed herein are formulations to be added to a paper precursor during papermaking, comprising a first volatile debonder and a second volatile debonder, wherein the first and the second volatile debonders are soluble in each other and in water, wherein the first and second volatile debonders evaporate from the paper precursor without leaving residua in the paper precursor after drying, and wherein the first and second volatile debonders have different boiling points. In embodiments, one of the first and second volatile debonders is a lower molecular weight debonder and the other of the first and second volatile debonders is a higher molecular weight debonder. The first and the second volatile debonders can be mixed together in a water solution that is added to the paper precursor, or one of the first and second volatile debonders is mixed with water and added to the paper precursor separately from the other volatile debonder. In embodiments, neither the first nor the second volatile debonder forms an azeotropic mixture with water.

Further disclosed herein are methods for making a debonded paper sheet, comprising preparing a volatile debonder formulation compatible with the aqueous environment of a paper precursor, wherein the volatile debonder formulation comprises at least one volatile debonder; applying the volatile debonder formulation to the aqueous environment to form a debonded paper precursor; and processing the debonded paper precursor through a papermaking process, wherein the papermaking process has a drying step as its final stage, and wherein the at least one volatile debonder evaporates from the debonded paper precursor during the drying step, thereby forming the debonded paper sheet. In embodiments, the volatile debonder formulation comprises at least two volatile debonders, each having a different boiling point. In embodiments, the at least two volatile debonders comprise a first volatile debonder having a higher molecular weight and a second volatile debonder having a lower molecular weight. The step of preparing the volatile debonder formulation can comprise preparing an emulsion that disperses the volatile debonder formulation in the aqueous environment. The step of applying the volatile debonder formulation to the aqueous environment can comprise mixing the volatile debonder formulation with the paper precursor before the drying step. The step of mixing the volatile debonder formulation with the paper precursor can comprise forming an azeotropic mixture. The step of applying the volatile debonder formulation to the aqueous environment can comprise spraying or topically applying the volatile debonder to the paper web.

Also disclosed herein are methods for making a debonded paper sheet without debonder residua, comprising adding a first volatile debonder to a paper precursor in an aqueous environment to form a debonded paper precursor, wherein the first volatile debonder is evaporable during a drying process without leaving debonder residua; and processing the debonded paper precursor through the drying process, thereby evaporating the volatile debonder without leaving debonder residua, and thereby making the debonded paper sheet without debonder residua. In embodiments, this method further comprises adding a second volatile debonder to the paper precursor in an aqueous environment, wherein the second volatile debonder is evaporable during the drying process without leaving debonder residua. In embodiments, the first volatile debonder and the second volatile debonder have different boiling points. In embodiments, one of the first volatile debonder and the second volatile debonder has a lower molecular weight, and the other of the first volatile debonder and the second volatile debonder has a higher molecular weight.

DETAILED DESCRIPTION

1. Volatile Debonders in Papermaking

Figure 1:
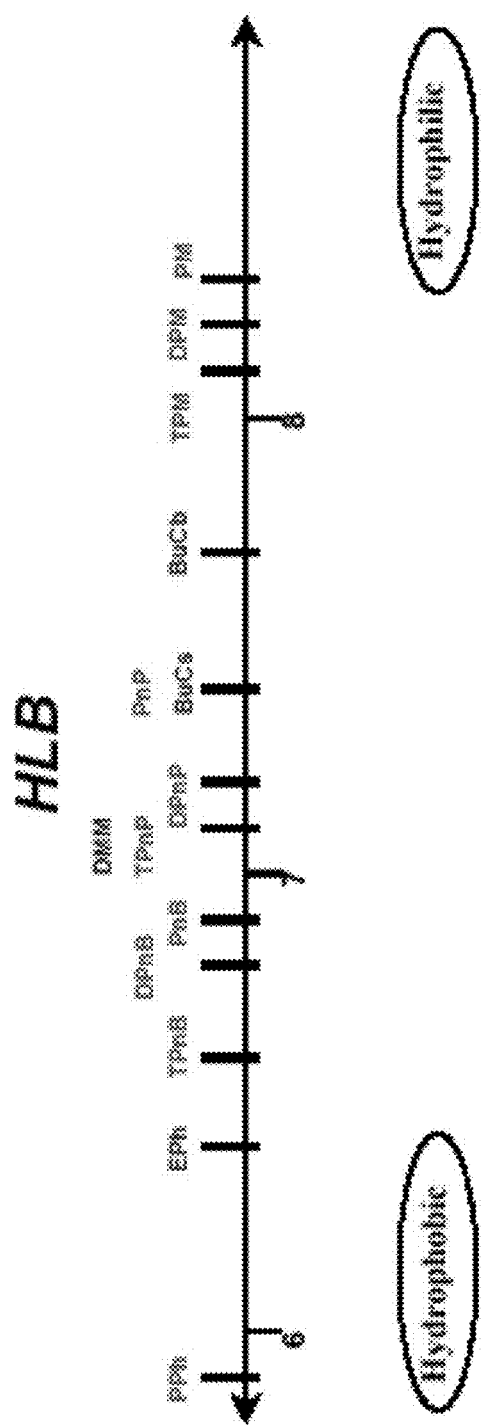
FIG. 1 shows the hydrophilic-lipophilic balance values for various volatile debonders.

Disclosed herein, in embodiments, are volatile debonders capable of interacting with cellulose pulp to decrease the intermolecular forces in the paperboard, but also capable of evaporating under processing temperatures so that there is minimal residual debonder when the paperboard is pressed into final form. Hence, the debonded paperboard possesses mechanical properties that facilitate processing into fluff pulp, while the resultant fluff pulp does not contain debonder residua that affect the wicking properties of the product.

The volatile debonders as disclosed herein can be added at any point of the papermaking process before the paper web is dried completely to form the paper sheet. As would be understood by skilled artisans, during the early stages of drying, the cellulose fibers are not bonded to each other. Adding a volatile debonder, as disclosed herein, to the paper precursor at this early stage of drying or before this early stage of drying can serve to keep the cellulose fibers apart and prevent their effective bonding. As drying progresses, the cellulose fibers in the paper precursor are normally drawn together, and bonding begins. The presence of a volatile debonder interferes with this bond formation. Initially, if no debonder is present, surface tension attracts the cellulose fibers in the paper precursor material to each other, but then intermolecular forces take over to effect the final bonding to form the paper sheet. The presence of the volatile debonder as the paper precursor dries interferes with this bond formation. As used herein, the term "paper precursor" refers to the water-containing pulp mixture or paper-forming material at any point before the critical drying period when cellulose fibers begin to bond to each other to form paper sheets.

As an example, a volatile debonder can be added to the wet end of the papermaking process, on the wet web after the head box, to the wet web before the press section, or after the press section but before the dryers. The paper-forming material at any of these stages before complete drying can be termed a "paper precursor." In embodiments, the volatile debonder can also be added, for example by spraying or topically applying the volatile debonder formulation at the beginning of the drying section, provided that it is applied to the paper precursor before the critical drying point is reached where cellulose fiber attraction and bonding would otherwise occur.

In embodiments, formulations are prepared where the debonding agent is water-soluble, but where the water and the active debonder ingredient can form an azeotropic mixture that allows both water and debonder to be evaporated together at a working temperature for the papermaking process. An azeotrope is a mixture of two or more liquids, the composition of which does not change upon distillation. Such liquid mixtures behave like a single substance in that the vapor produced by partial evaporation of liquid has the same composition as the liquid. Thus, the mixtures distill at a constant temperature without change in composition and cannot be separated by normal distillation.

In embodiments, active debonder ingredients can be selected that have specific hydrophilic or hydrophobic properties, but that are still water-soluble, and that can be evaporated at a working temperature for the papermaking process. Once the sheet is dried at temperatures of >90° C., the debonder molecules evaporate, leaving behind a very small or no residue and a debonded sheet which has the wicking properties close to that of untreated pulp fibers.

In embodiments, the selected debonder is capable of forming an azeotropic mixture with water. In embodiments, a positive azeotropic mixture can be formed, for example one having a constant boiling point lower than the boiling point of water. In other embodiments, a negative azeotropic mixture can be formed. Advantageously, the azeotrope formed by the water and the volatile debonder is designed so that both agents boil off at the processing temperature of the pulp during the drying stage of papermaking, approximately 110-180° C., with the presence of the volatile debonder acting to keep the paper fibers sufficiently separated that they are less likely to form intermolecular bonds. Although certain such volatile debonder compounds boil at temperatures higher than that of paper processing/drying, the fact that they form azeotropes helps in their removal during the drying temperatures encountered in the papermaking process.

Not to be bound by theory, it is understood that during the early stages of the drying process in papermaking, the pulp enters the drying section of the mill containing about 60% water. The free water in the pulp acts as a capillary attractant, pulling the cellulose fibers towards each other. As the free water is driven off during drying, the fibers are drawn even closer together as intermolecular bonding takes place. This normal process of papermaking yields a strong paper sheet that must then be mechanically debonded to form fluff pulp, as previously described. In some cases, traditional organic debonders can be used to keep the cellulose fibers separated before and during the drying process, so that the final product is easier to mechanically debond. These organic debonders, though, impart a hydrophobicity to the paper product that poses problems for fluff pulp uses where wicking of aqueous material is desired.

When the volatile debonders disclosed herein are used, the intermolecular processes in the paper product are different, as is the final result. In embodiments, the water-soluble volatile debonders as disclosed herein can act as spacers to separate the cellulose fibers, so that they do not draw close enough to form hydrogen bonds during drying. The spacing between the pulp fibers produced by the debonder decreases the fibers' capacity for intermolecular bonding, just as occurs with traditional organic debonders. The co-presence of the debonder molecules and the water molecules impairs the ability of the cellulose fibers to form bonds. Furthermore, because the volatile debonders disclosed herein evaporate along with the water during drying, the final product does not contain organic residua that can impair the hydrophilicity and wicking of the product when it is used for fluff pulp. In embodiments, the debonder and water form an azeotropic mixture, assuring their co-presence throughout the evaporation process.

2. Exemplary Volatile Debonders

It has been unexpectedly discovered that a certain class of molecules having a range of HLB values ("HLB" stands for hydrophilic-lipophilic balance, where a value of 0 means a completely hydrophobic molecule and a value closer to 20 indicates a hydrophilic molecule) that are miscible with water can be used as volatile debonders in accordance with this disclosure. In embodiments, these molecules have varying boiling points and can be selected in accordance with their attraction to the underlying surface so that they change the surface energy (and hence the wetting or non-wetting characteristics of the surface) in a temporary manner. In embodiments, molecules useful as volatile debonders are water-miscible. In embodiments, the volatile debonder molecules can form azeotropic mixtures with boiling points that are compatible with the operating temperatures of the papermaking process. In embodiments, the azeotropic mixture formed between the volatile debonder and water will evaporate during drying. In embodiments the volatile debonder compounds can be sprayed onto a wet paper web during the papermaking process.

One such class of molecules includes glycol ethers having aliphatic and or aromatic side chains. As examples, a number of glycol ethers having advantageous properties as volatile debonders are included in the DOWANOL® line of solvents (DOW Corp., Midlands Mich.). In other embodiments, glycol ethers having advantageous properties include those manufactured as Acrosolv products from LyondellBasell (Houston, Tex. USA) or Eastman solvents from Eastman Chemicals (Kingsport, Tenn. USA).

Other useful molecules include other Ethylene glycol ethers such as Ethylene glycol monomethyl ether, Ethylene glycol monoethyl ether, Ethylene glycol monopropyl ether, Ethylene glycol monoisopropyl ether, Ethylene glycol monobutyl ether, Ethylene glycol monobenzyl ether, and the like, and other glycol ether acetates such as Ethylene glycol methyl ether acetate, Ethylene glycol monethyl ether acetate, Ethylene glycol monobutyl ether acetate, and the like. Molecules with higher molecular weights have higher boiling points, a factor that can influence selection as a volatile debonder for papermaking. In embodiments, tripropylene glycol n-butyl ether and tripropylene glycol methyl ether (both with higher molecular weights than certain other glycol ethers) have advantageous properties as volatile debonders. In other embodiments, propylene glycol n-Butyl ether and dipropylene glycol n-butyl ether (both hydrophobic on the HLB scale) have advantageous properties as volatile debonders. Other molecules suitable include branched alkyl alcohols such as Masurf NRW-N (Mason Chemical Company, IL).

The extent of debonding can be controlled by the amount of debonder added to the wet paper web and the choice of debonder with a hydrophobic HLB value. In embodiments, volatile debonder compounds have boiling points varying from 100° C. to 290° C. These molecules can be added to the wet-end white water system at concentrations ranging from 0.001 to 1% by weight of the white water in the system. Volatile debonders can be advantageously added in the range 0.001% to 0.1% by weight. In embodiments, volatile debonder compounds can be sprayed in water solution onto a wet moving web, or added thereto as an emulsion, as described below in more detail.

Molecules with lower HLB values can also be used that have a lower boiling point than the drying temperatures of the paper process when faster evaporation may be desirable. As an example, propylene glycol methyl ether is useful for this purpose. It is understood that the more hydrophobic glycol ethers typically have a lower solubility in water, so that when such molecules are used as volatile debonders with a high loading by fiber weight, it may be useful to emulsify them to facilitate their dispersion in an aqueous mixture. For example, a suitable cationic surfactant or other emulsifying agent can be used to enable binding of the hydrophobic glycol ether to the anionic cellulose fibers in the wet-end of the papermaking process.

As an example, tripropylene glycol n-butyl ether (DOWANOL® TPnB) has a solubility limit of ~2.5 wt %. If a loading higher than 3% is required, emulsification can be carried out to create a stable suspension of the TPnB in water at this concentration. Suitable emulsifiers for these purposes can include surfactants such as polyetheramines. As an example, a Jeffamine polyetheramine such as Jeffamine XTJ 502 compound could be used for emulsification of Dowanol TPnB if a loading higher than 3% by weight is desired.

In embodiments, emulsified debonders having low HLB values can be added to the wet end of the papermaking line. For example, if a polyetheramine such as a Jeffamine is used as the emulsifying agent, the primary amine in the Jeffamine molecule can act as an anchor that binds the debonder to the cellulose fiber surface. In other embodiments, a primary amine such as is present in the Jeffamine emulsifier could act as an anchor group thereby binding the debonder to the fiber surface. In other embodiments, the volatile debonder molecules can also be sprayed onto moving webs. Because of their volatility, they are able to exert their debonding effect during the drying stages of papermaking, but they then evaporate off and leave no residuum to impair the hydrophilic nature of a final paper product.

3. Debonding Mixtures

Volatile debonders of high molecular weight are understood to be more effective at debonding pulp than those of lower molecular weight. Higher molecular weight debonders also have higher boiling points. Exemplary higher molecular weight debonders, as described herein, are those having molecular weights in the range of about 300 to about 500 Daltons. Exemplary lower molecular weight debonders, as described herein, are those having molecular weights in the range of about 30 (e.g., methanol=32) to about 150 Daltons. In accordance with the systems and methods disclosed herein, high wicking speed in the debonded pulp is optimized by removing all of the volatile debonder in the drying section of the papermaking machine. Those debonders with lower boiling points are easier to remove, requiring less heat to drive them off; undesirably, however, the lower boiling point (lower molecular weight) debonders are less effective at debonding. For a less effective debonder, such as a lower molecular weight debonder, the pulp is not as completely debonded. As a result, a higher concentration or a larger amount of the less effective debonder (such as a lower molecular weight debonder) needs to be used to achieve a satisfactory debonding effect, a situation that can be less economical or efficient than the use of a more effective debonder. However, if the more effective higher molecular weight debonders are to be used, more heat or steam will be required in the drying section of the paper machine to enable their complete removal, especially for those debonders that do not form azeotropic mixtures with water.

To optimize debonding while minimizing the need for additional drying heat or steam, volatile debonders of high boiling point and low boiling points can be mixed to form tunable debonding mixtures. In embodiments, the tunable debonding mixture can be formed by mixing a higher molecular weight debonder and a lower molecular weight debonder with water in a designated ratio. In embodiments, the component debonders are selected from those that do not form azeotropic mixtures with water. It would be understood by artisans having ordinary skill, that debonders or other agents forming azeotropic mixtures are already known in the art, or that this tendency for a given molecule can be demonstrated using routine experimentation.

As the debonders are fully miscible with each other and with the water, the sequence of addition of the components to the mixture is not critical. The component debonders can be premixed with each other and/or with water, or they can be added in any order to the pulp during processing. The ratio of the component debonders in the mixture can be optimized to obtain different levels of debonding and wicking speeds, or it can be optimized to reduce the energy demand in the drying section of the papermaking machine while obtaining a debonded and high-wicking pulp. Mixtures of high molecular weight and low molecular weight debonders can be tuned to optimize selected performance characteristics (e.g., debonding levels, wicking speeds, energy consumption).

Figure 7A:
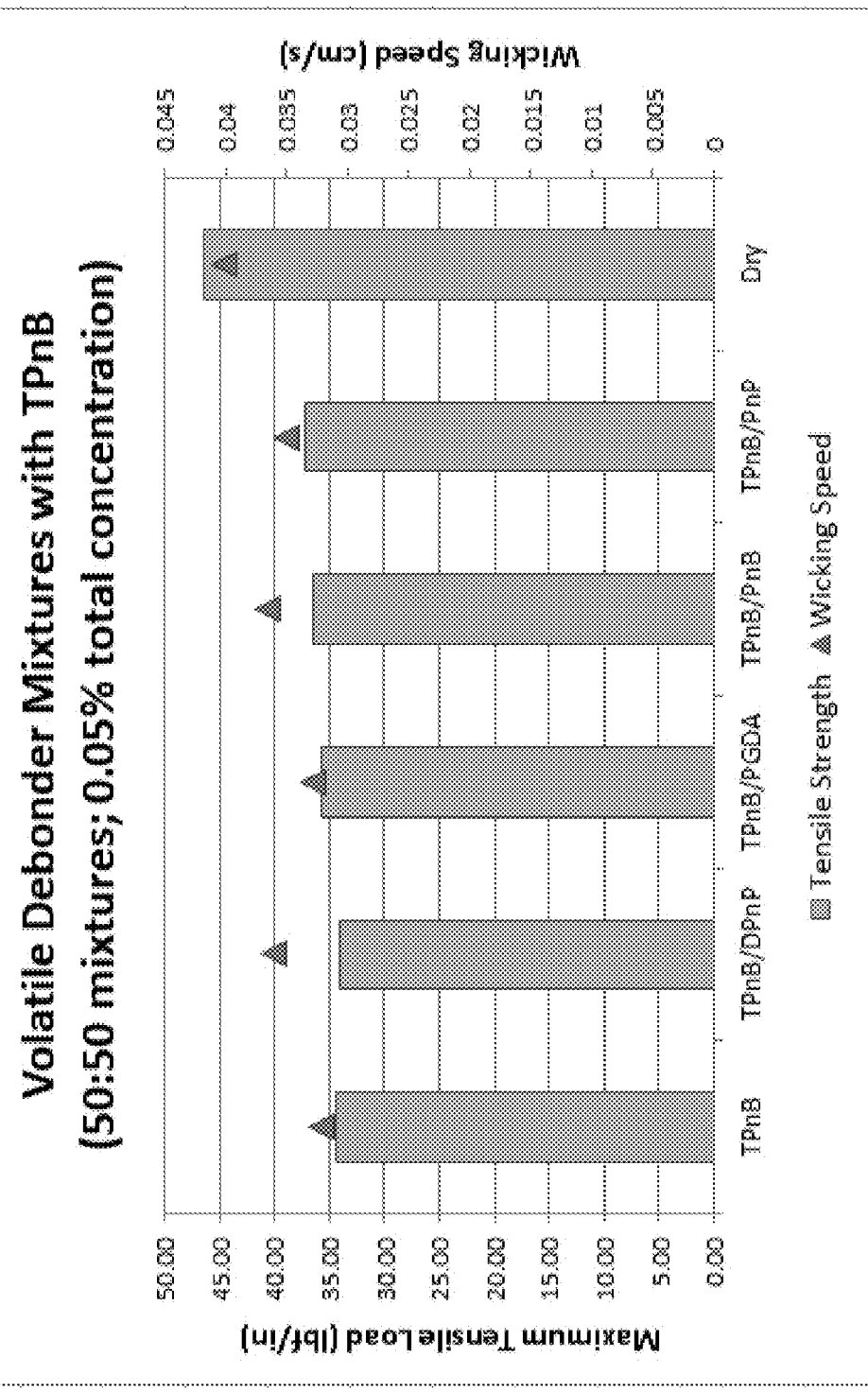
FIG. 7A shows the tensile strength and wicking speed for paper strips treated with various volatile debonders and mixtures thereof.
Figure 7B:
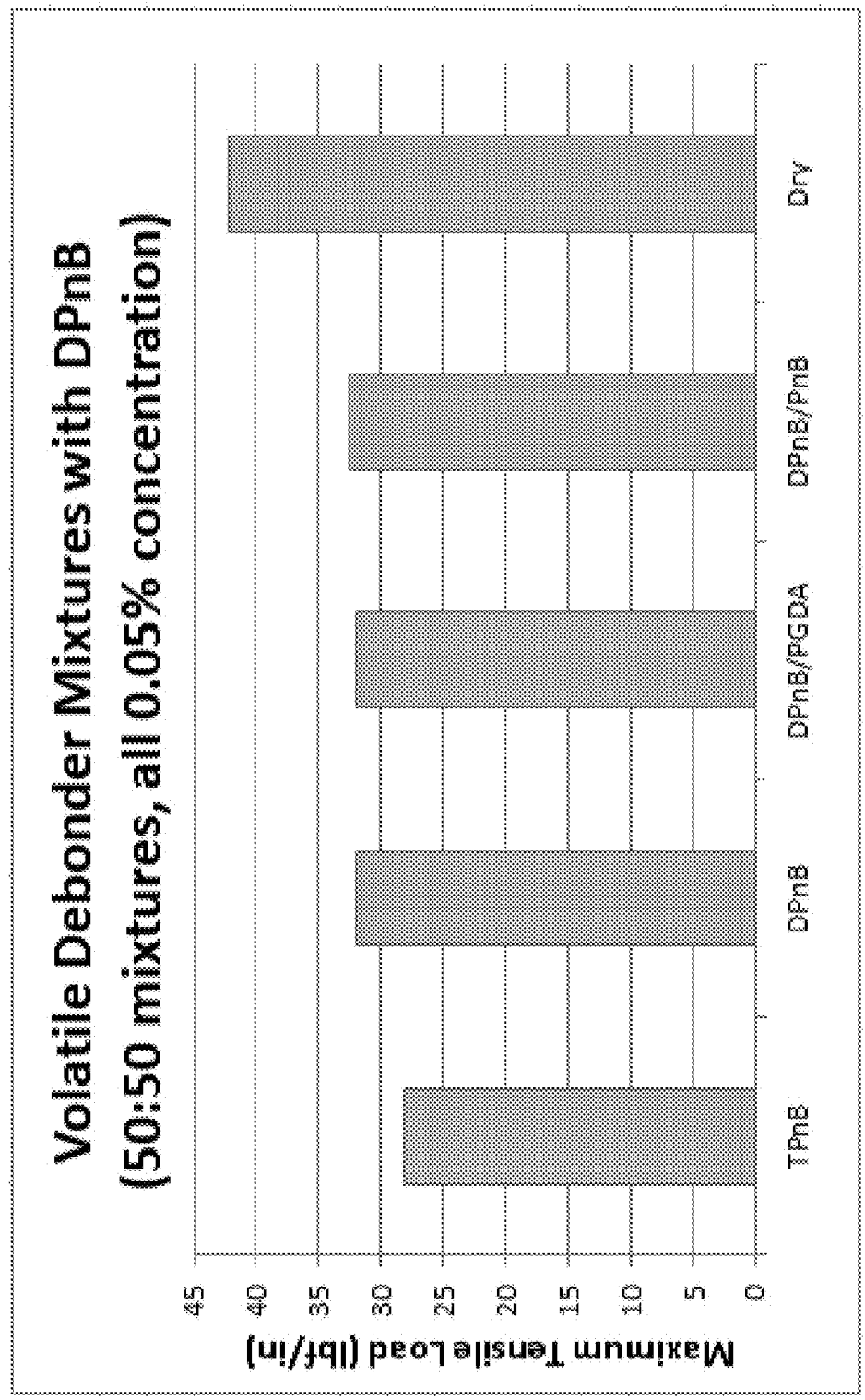
FIGS. 7B and 7C show the tensile strength for paper strips treated with various volatile debonders and mixtures thereof.
Figure 7C:
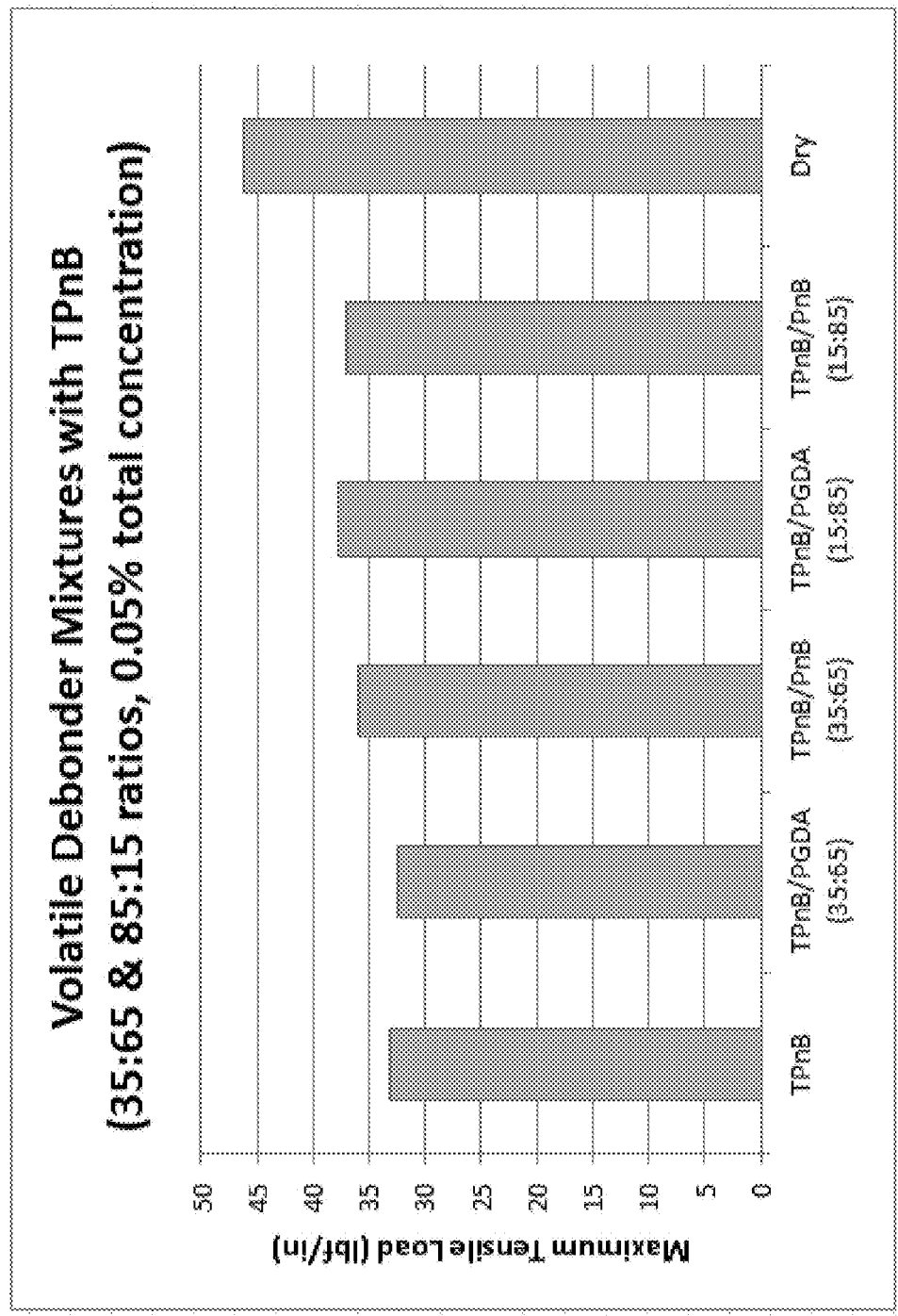

As one example, a 50:50 mixture of a high molecular weight debonder such as Tripropylene glycol n-butyl ether (B.P. 274C) (TPnB) can be combined with a low molecular weight debonder such as Propylene glycol propyl ether (B.P. 171C) ("PnP") or Propylene glycol n-butyl ether (B.P. 149C) (PnB). FIG. 7A shows the reduction in bonding strength and the effect on wicking speeds for paper treated with various mixtures of low molecular weight debonders with TPnB. FIG. 7C shows that a high molecular weight debonder (TPnB) can be mixed with lower boiling point debonders at different ratios by weight, such as 15% and 35%, to obtain tunable debonding strength and wicking speeds.

Advantageously, mixtures of a higher molecular weight and a lower molecular weight debonder can improve debonding substantially, while maintaining wicking properties for the finished debonded product. In such a mixture, the presence of the lower boiling point debonder allows it to be driven off with less energy expenditure than would be necessary if only a higher molecular weight agent were used. In embodiments, substantially less of the higher molecular weight volatile agent can be used to effect debonding, with attendant energy savings. In embodiments, mixtures of higher molecular weight volatile debonders and lower molecular weight volatile debonders can achieve the same amount of debonding efficacy as the use of the higher molecular weight agent alone.

EXAMPLES

Materials

In the Examples below, the following materials were used.
Softwood pulp
Processed pulp sheets (670 GSM basis weight)
Masurf NRW-N (Mason Chemical Company, IL) (aqueous surfactant comprising branched alkyl alcohol)
DOWANOL® compounds as listed in the following Table 1:

TABLE 1

DOWANOL ® compounds (DOW Corp., Midland, MI)

| Name | MW | Evaporation time and temp. | HLB |
|---|---|---|---|
| DPM (dipropylene glycol methyl ether) | 148.2 | Mid to slow evaporating, bp = 190 C., flp = 75 C. | Hydrophilic ~8.2 |
| DPnB (dipropylene glycol n-butyl ether) | 190.3 | Slow evaporating, bp = 230 C., flp = 100.4 C. | Hydrophobic ~6.8 |
| DPnP (dipropylene glycol n-propyl ether) | 176.2 | Slow evaporating, bp = 213 C., flp = 88 C. | Hydrophilic/ Hydrophobic ~7.2 |
| PGDA (propylene glycol diacetate) | 160 | Bp = 190 C., flp = 95 C. | |
| PM (Propylene glycol methyl ether) | 90.1 | Fast evaporating, bp = 120 C., flp = 31 C. | Hydrophilic ~8.3 |
| PnB (propylene glycol n-Butyl ether) | 132.2 | Fast evaporating, bp = 171 C., flp = 63 C. | Hydrophobic ~6.9 |
| PnP (propylene glycol n-propyl ether) | 118.2 | Fast evaporating, bp = 149 C., flp = 48 C. | Hydrophilic/ hydrophobic ~7.4 |
| PPh (propylene glycol phenyl ether) | 152.2 | Slow evaporating, bp = 243 C., flp = 115 C. | Very hydrophobic ~5.9 |
| TPM (Tripropylene glycol methyl ether) | 206.3 | Slow evaporating, bp = 243 C., flp = 121 C. | Hydrophilic ~8 |

TABLE 1-continued

DOWANOL ® compounds (DOW Corp., Midland, MI)

| Name | MW | Evaporation time and temp. | HLB |
|---|---|---|---|
| TPnB (tripropylene glycol n-butyl ether) | 248.4 | Slow evaporating, bp = 274 C., flp = 126 C. | Hydrophobic ~6.6 |
| DMM (dipropylene glycol dimethyl ether) | 162.23 | bp = 175 C., flp = 65 C. | Aprotic ~7 |

The HLB properties for these products are set forth on FIG. 1.

Unless otherwise indicated, the percentages recited in the Examples are weight percentages.

Example 1

Tensile Test

Tensile tests were conducted on samples using an Instron Model 3343. Samples were cut into 1 in wide strips with a paper cutter. The gauge length region was set at 4 in and the crosshead speed was 1 in/minute. Thickness was measured to provide stress data as was the weight to be able to normalize the data by weight of samples. The samples were tested to failure with an appropriate load cell. At least three strips from each sample were tested and the values were averaged together.

Example 2

Vertical Wicking Speed Test

To determine the wicking speed for a sample, a 1" wide strip of the paper was prepared. The strip was clamped onto a fixture such that it hung vertically. A 500 mL beaker was filled with 100 mL of water and placed below the paper strip on a stage that could be raised and lowered. The stage was raised such that 5 mm of the bottom of the paper strip was submerged in the water. The strip was marked with pencil lines above the water level at 1cm increments up to 10 cm. Wicking speed was determined by the time taken by the water level to reach the different heights.

Example 3

Handsheet Preparation

To prepare handsheets of ~200 grams per square meter (GSM) a 0.5% fluff pulp slurry was thoroughly dispersed using an overhead mixer. To this, appropriate amounts of 2% Dowanol solutions were added to create a specific concentration of the Dowanol solution in the water, as described in the Examples below. These constituents were mixed for 30 s and then put into the handsheet mold. Shear was applied using an overhead stirrer mixing at 1100 rpm for 5 seconds, 700 rpm for 5 seconds, and then 400 rpm for 5 seconds. Following this, the sample in the mold was allowed to drain and vacuum was applied to remove excess water. The resultant sheet was blotted, pressed, and dried in rings in the oven at 110° C. for 14 minutes.

Example 4

Mechanical Strength and Wicking Tests

Figure 2:
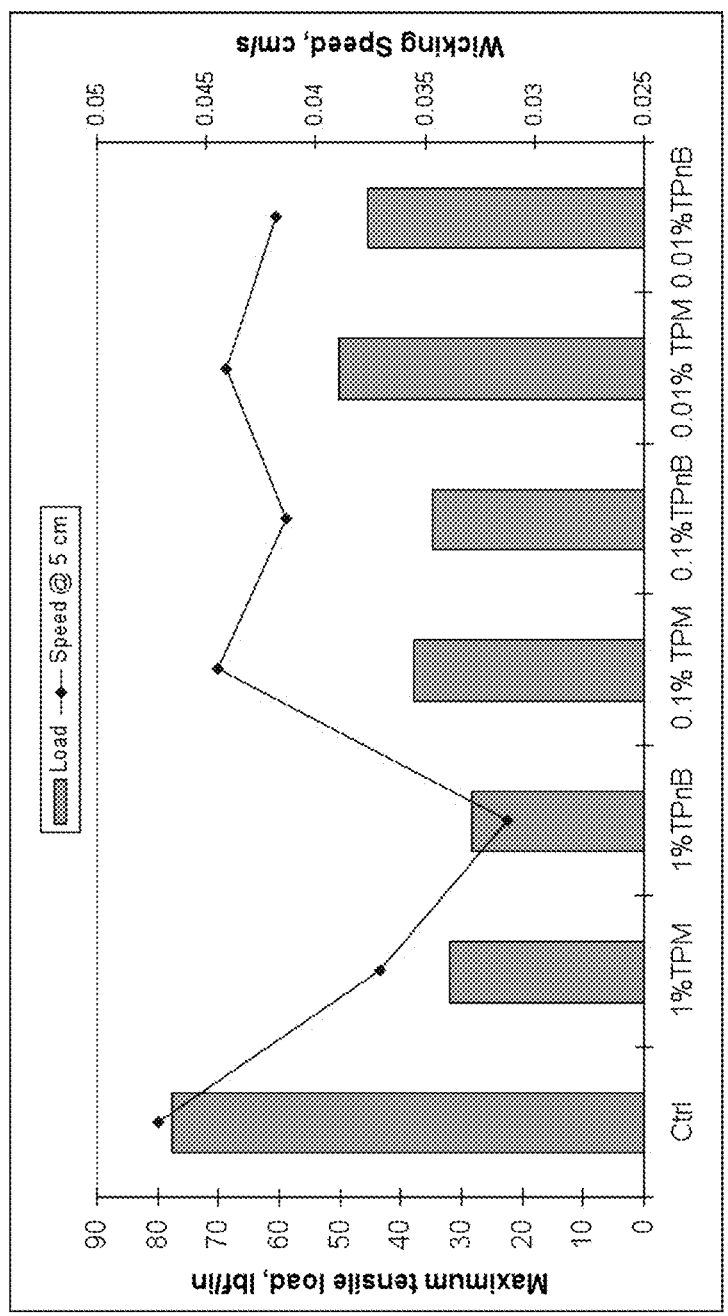
FIG. 2 shows the maximum tensile load and the wicking speed for paper strips treated with various volatile debonders.

Tensile load at failure was measured for paper strips treated with volatile debonders by dipping 1" by 6" strips of 670 GSM basis weight paper strips for approximately 30 seconds in 50 mL centrifuge tubes containing solutions containing Dowanol compounds in deionized water at concentration ranging from 1%/wt, to 0.01%/wt until the strips were saturated. The resulting samples were then pressed and dried at 110° C. for 20 minutes. The protocol of Example 1 was used to determine the Energy and Max Load values. Corresponding wicking speeds were measured using the protocol described in Example 2. For this experiment, samples were prepared using compounds listed in Table 1, with an untreated sample as the control. FIG. 2 shows the maximum tensile load at failure along with wicking speeds measured using the time required for water to wick up to 5 cm vertical distance on the paper strip. As shown in FIG. 2, the volatile debonders that were tested show effective debonding at solution concentrations as low as 0.01%. The decrease in tensile strength is nearly 50% while the loss in wicking speeds is <15%.

Example 5

Types of Volatile Debonders

Figure 3:
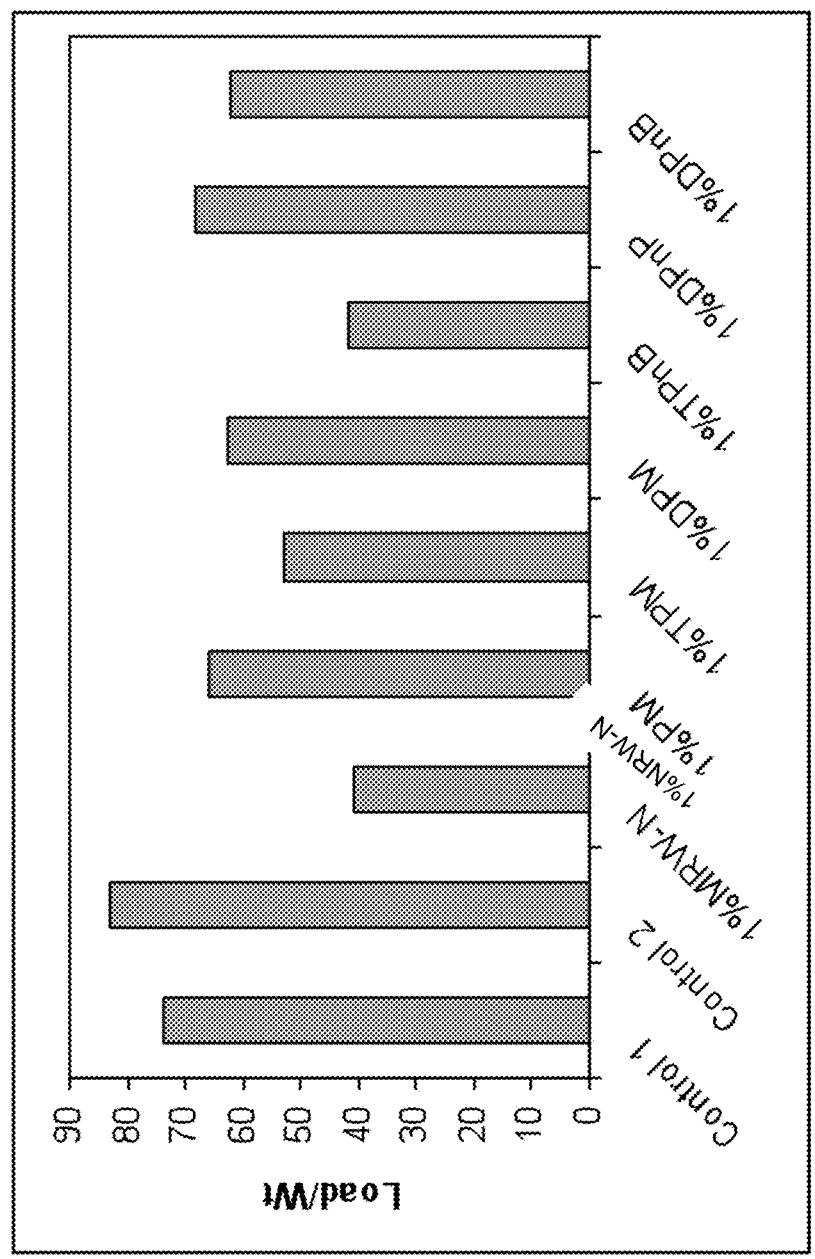
FIG. 3 shows the tensile strength for fluff pulp treated with various volatile debonders.

1"×6" strips of dried fluff pulp were dipped for 2 minutes into water (control) and into 1% solutions of various volatile debonders with a range of HLB properties. The resulting samples were dried at 110° C. for 50 minutes. Afterwards, Instron testing as in Example 1 was performed to see which samples provided the greatest decrease in strength. The results are shown in FIG. 3. As shown in FIG. 3, the Dowanol TPnB showed the highest decrease in tensile strength but lowest effect on wicking of the treated pulp.

Example 6

Wet End Addition of Volatile Debonder

Figure 4A:
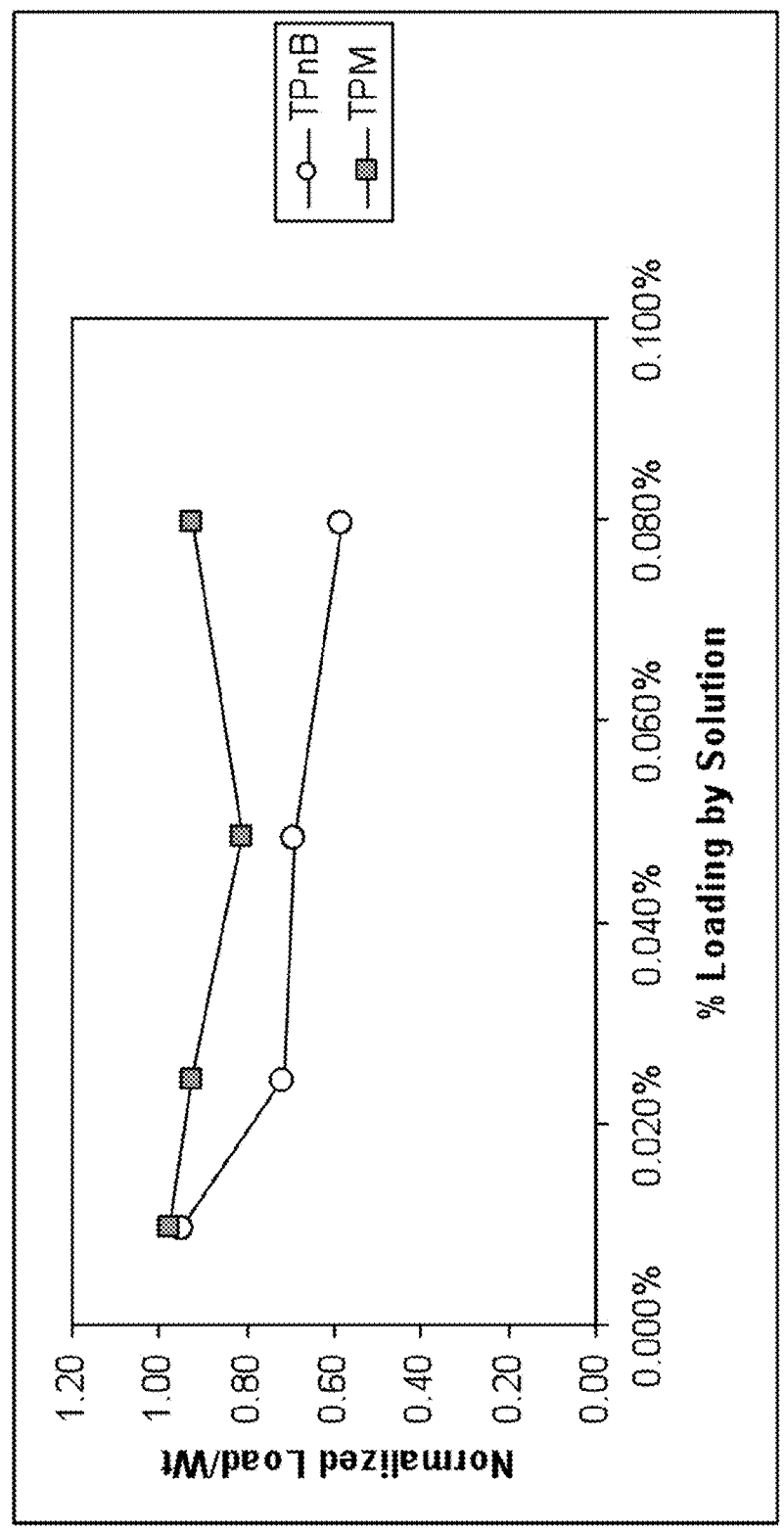
FIG. 4A shows the tensile strength for paper strips treated with different concentrations of various volatile debonders.
Figure 4B:
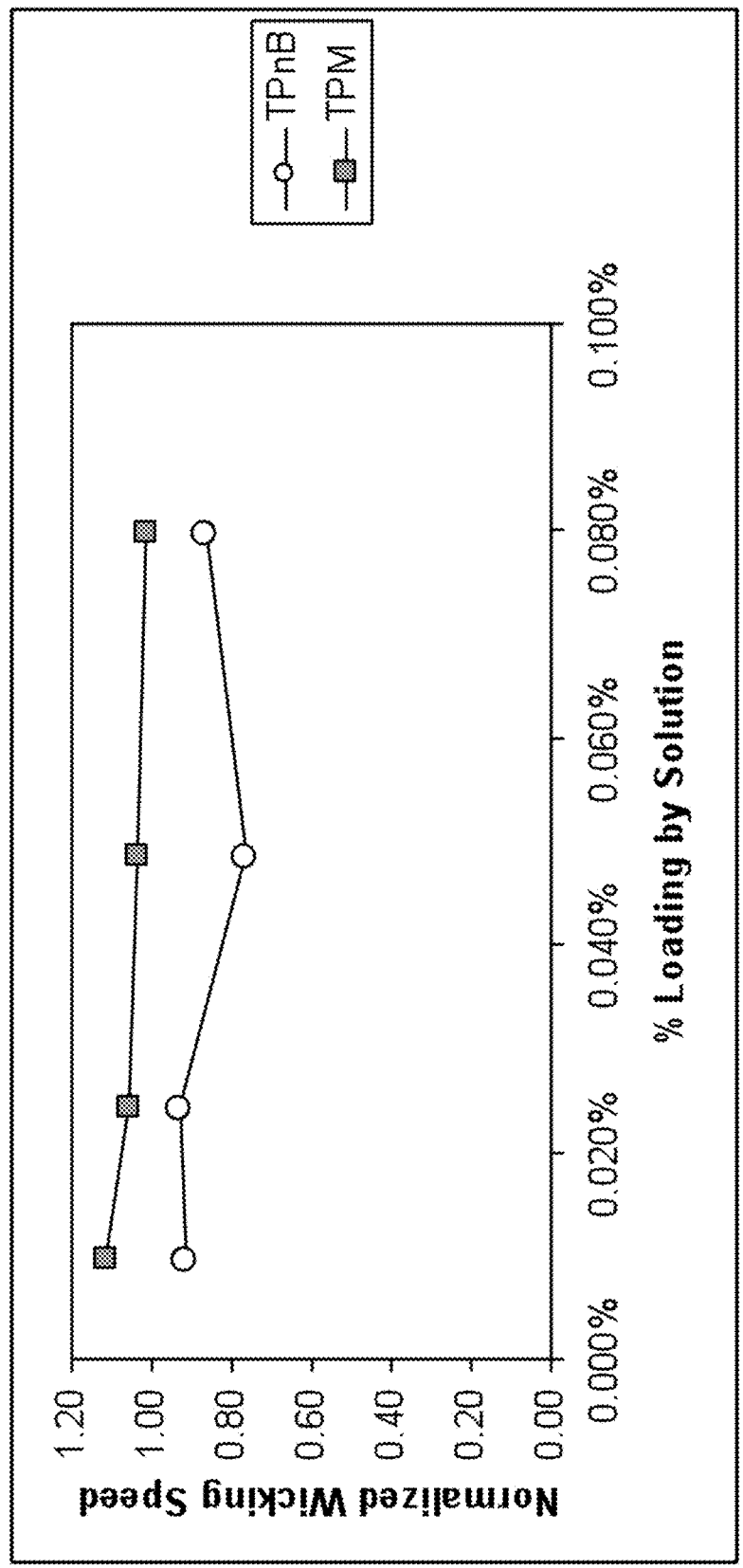
FIG. 4B shows the wicking speed for paper strips treated with different concentrations of various volatile debonders.

Handsheet samples were prepared using the method in Example 3. Dowanol TPM and Dowanol TPnB were applied to the handsheets at concentrations of 0.01%, 0.025%, 0.049%, and 0.08%. The handsheet samples were tested for tensile strength and wicking using the methods in Examples 1 and 2. The results of these tests are shown in FIGS. 4A and 4B. As shown in these Figures, TPnB showed a greater decrease in strength, up to about 40%, with a decrease in wicking of about 20%, compared to control. As shown in the Figures, a trend is evident with increasing concentrations.

Example 7

Recirculated Water

Figure 5A:
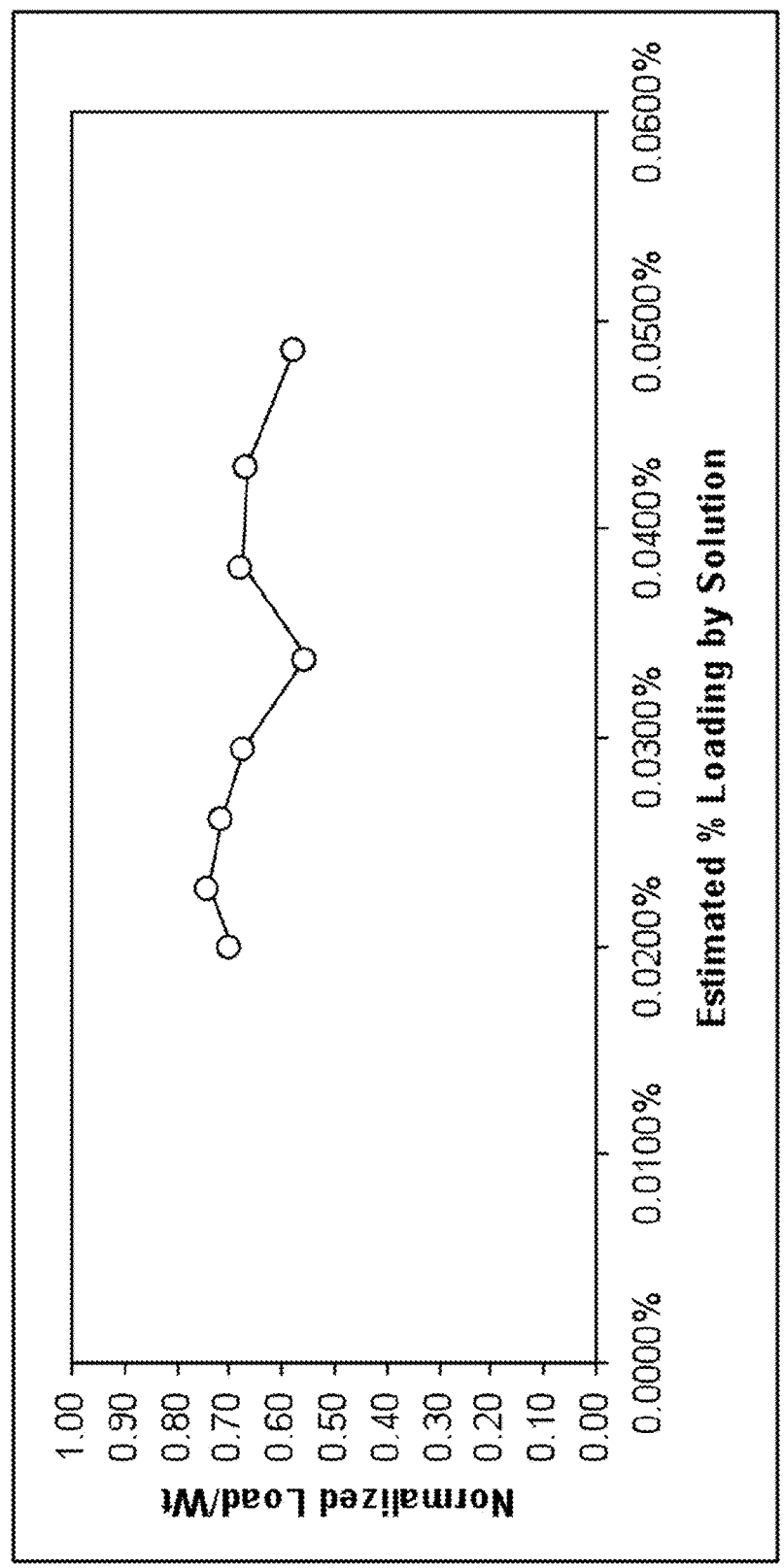
FIGS. 5A and 5B show, respectively, the tensile strength and wicking results from Example 7.
Figure 5B:
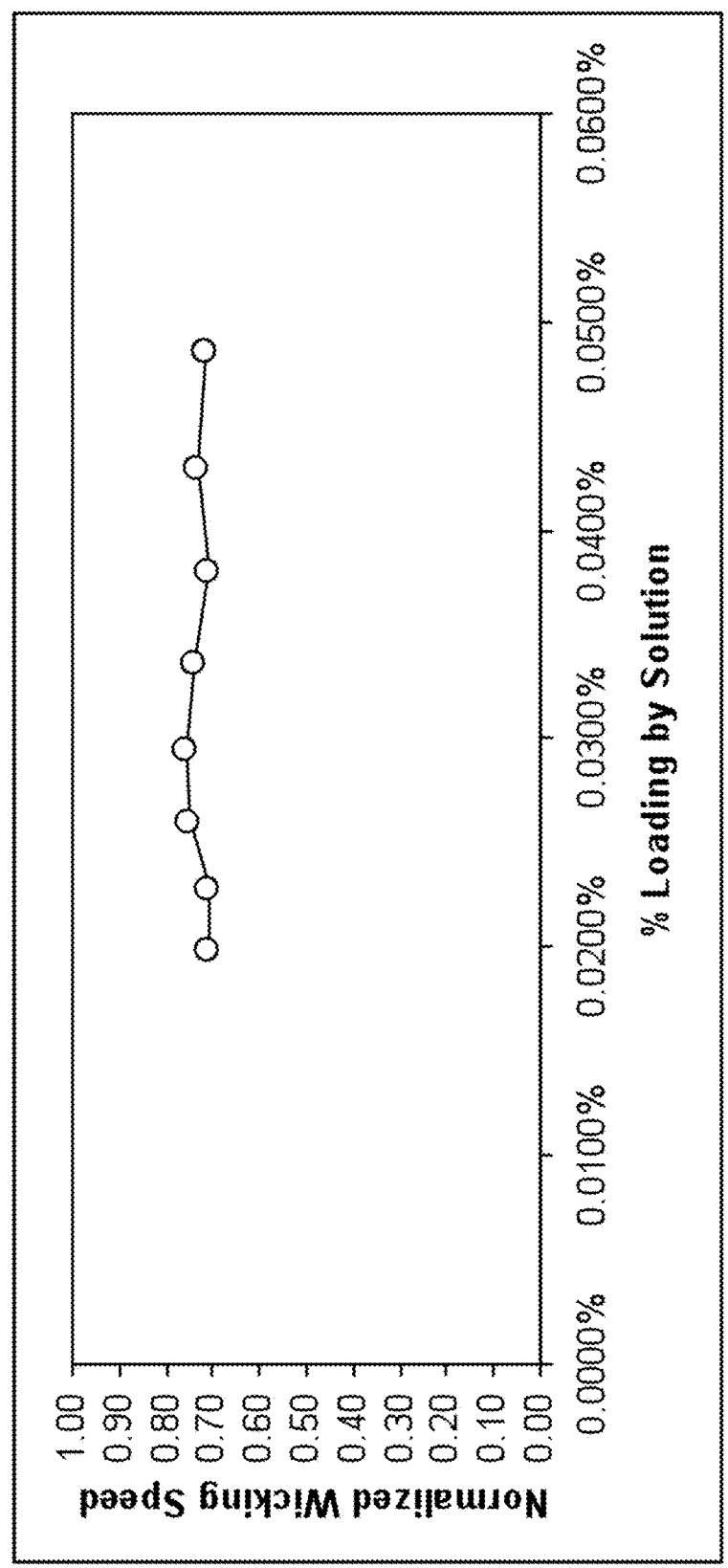

Samples were prepared using the procedure in Example 3, with a procedural modification whereby Dowanol was added to the first sample only. For subsequent samples, the white water effluent from the handsheet papermaking process was collected and re-used as dilution water to prepare the pulp slurry. In certain cases, a minimal amount of additional water was added to supplement the collected water. The initial concentration of the Dowanol TPnB was measured and the other concentrations were estimated. Testing was done using the methods in Experiments 1 and 2. The results of tensile strength and wicking speed are shown in FIGS. 5A and 5B respectively. As shown in these Figures, a generally decreasing trend in load/weight is seen with increasing TPnB concentration, while the wicking stays relatively constant across concentrations, indicating efficient evaporation of the solvent in the temperature range used for drying the pulp.

Example 8

Thermogravimetry (TG) and TG-Mass Spectrometry (TG-MS) Testing

Figure 6A:
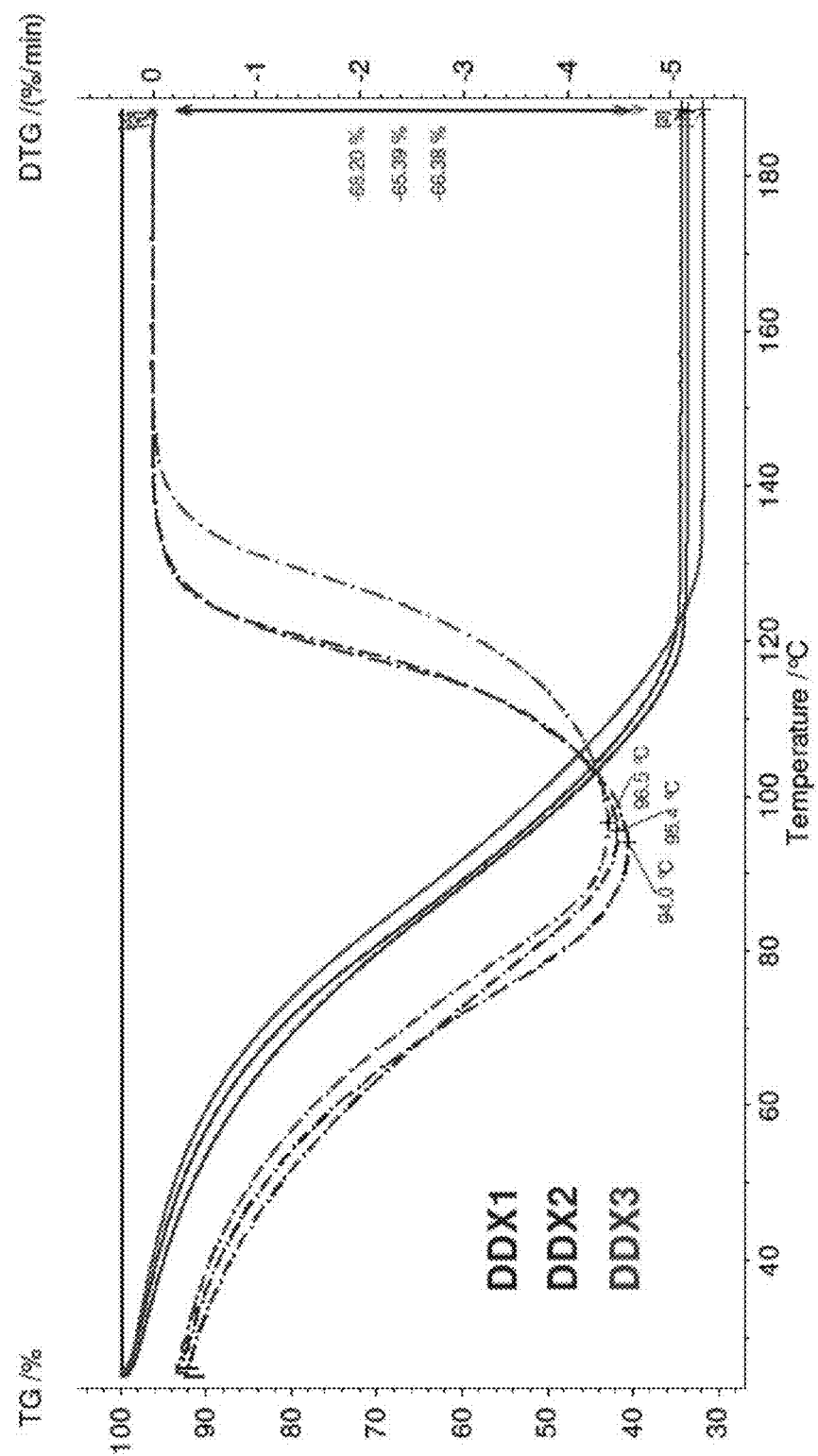
FIG. 6A shows the thermogravimetry results from Example 8.
Figure 6B:
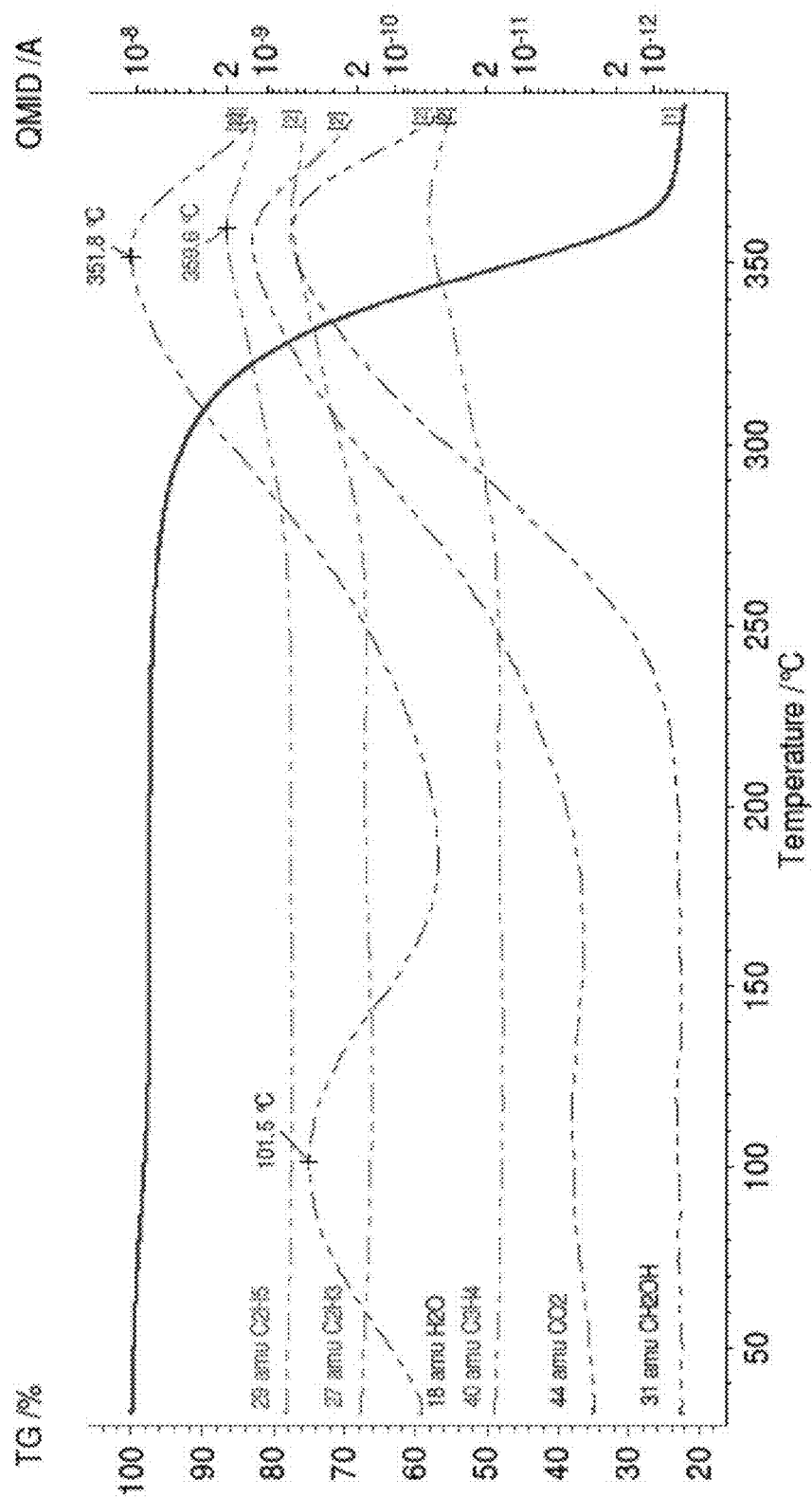
FIGS. 6B and 6C show the thermogravimetry-mass spectrometry results from Example 8.
Figure 6C:
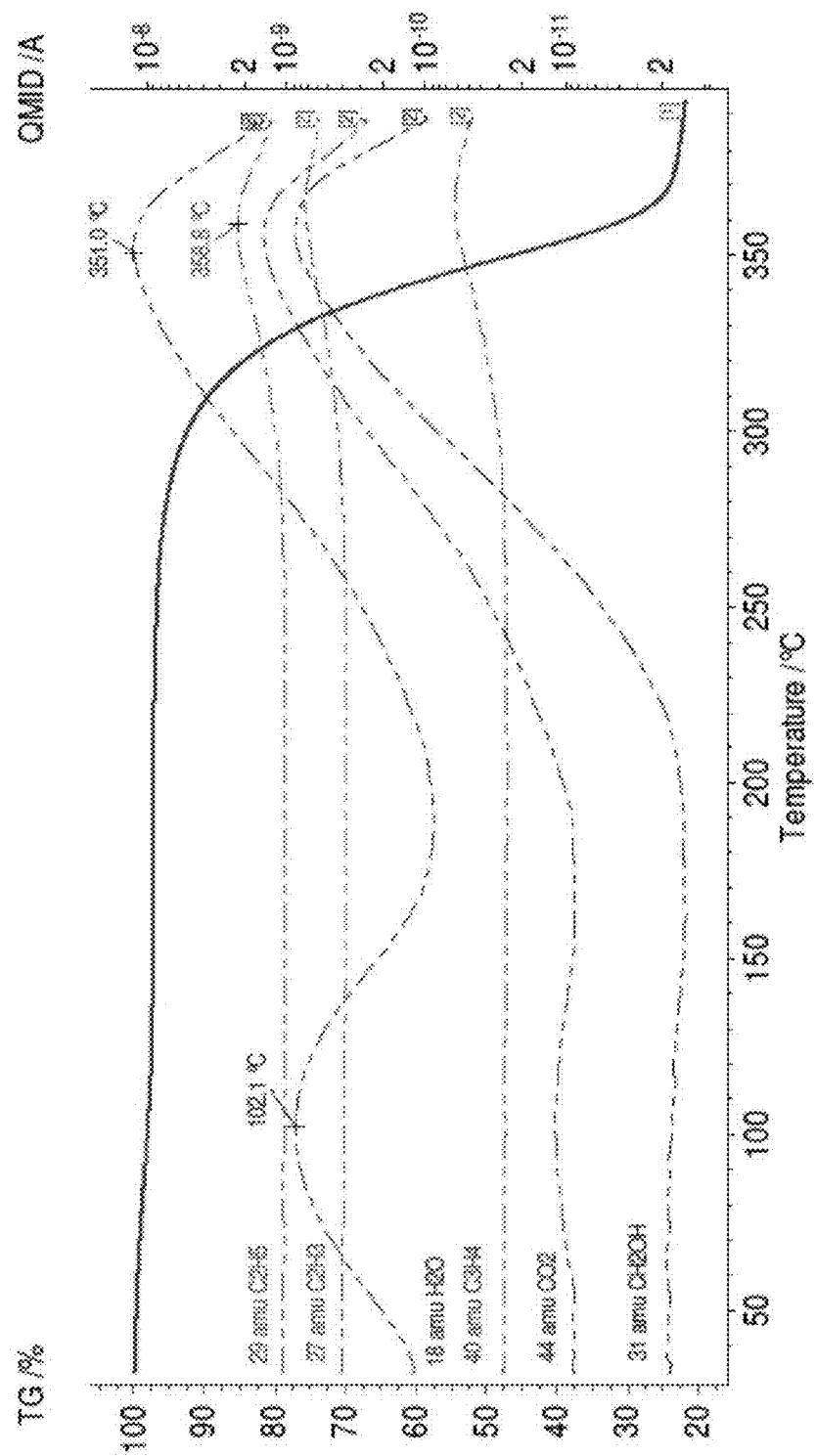

Samples were prepared using the method in Experiment 3 using 0%, 0.049%, and 0.095% Dowanol TPnB. Other samples were prepared with the same concentrations but with skipping the drying step from Experiment 3. The wet samples were tested using thermogravimetry to examine any changes in the weight loss profile and the dry samples were tested using thermogravimetric mass spectrometry to determine the amount of the residual debonder on the fibers. The results of these tests are shown in FIGS. 6A-C. In FIG. 6A, TG/% represents the weight loss and DTG represents the derivative weight loss. In FIGS. 6B and 6C, the TG/% axis represents the weight loss and the QMID/A axis represents the mass/charge ratio of fragments measured by the mass spectrometer (expressed in units of QMID (Quasi Multiple Ion Detection) in Amperes). As shown in the Figures, it was observed that the use of the volatile debonder did not significantly affect the weight loss of the wet sample. Also the Figures show that no residual debonder was detected on the dry sample (profiles are the same for controls and treated samples). For FIG. 6A, TG curves are shown where DDX1 is the control (0% TPnB), DDX2 has 0.049% TPnB, and DDX3 has 0.095% TPnB. FIG. 6B shows the control sample TG-MS curves for selected mass numbers for the sample with 0% TPnB. FIG. 6C shows the TG-MS curves for selected mass numbers for the sample with 0.095% Dowanol TPnB. Notably, the curves in FIGS. 6B and 6C are approximately superimposable, showing that the pulp samples debonded with the 0.095% TPnB do not contain residua of the debonding agent.

Example 9

Drainage Time Testing

Samples were prepared using a TAPPI handsheet maker using concentrations of TPnB ranging from 0 to 0.1%, using the standard TAPPI test procedure. The pulp was refined to a freeness of ~650 CSF (Canadian Standard Freeness) Units. The drainage of the paper sheet on the screen was tested using TAPPI standard T221. Results, as shown in Table 2, indicated that that drainage of the paper sheet was unaffected by the inclusion of the volatile debonder into the water.

TABLE 2

| Concentration of Dowanol TPnB in Solution | Drainage Time (seconds) |
| --- | --- |
| 0% (Control | 4.28 |
| 0.01% | 4.27 |
| 0.025% | 4.27 |
| 0.03% | 4.27 |
| 0.035% | 4.31 |
| 0.04% | 4.31 |
| 0.05% | 4.32 |
| 0.1% | 4.24 |

Example 10

Mixed Volatile Debonders

1×6 inch strips of dried fluff pulp ere dipped for 15 seconds into water (control) and into 0.05% solutions of various mixed volatile debonders consisting of one high boiling point volatile debonder (TPnB or DPnB) and one low boiling point volatile debonder (DPnP, PGDA, PnB, or PnP) in a 50:50, 35:65, or 15:85 ratio. Samples treated with 0.05% TPnB and 0.05% DPnB were also used as controls in the experiments. The resulting samples were dried at 110° C. for 25 minutes. Afterwards, Instron testing as in Example 1 was performed to measure the decrease in strength for each sample. Wicking speeds were measured as described in Example 2 and are depicted in FIG. 7A. The results of these experiments are shown in FIGS. 7A, 7B, and 7C. As shown in FIG. 7A, the tensile strength in the selected 50:50 mixtures is similar to TPnB alone, and wicking speed appears unchanged as well. For FIG. 7B, tensile strength varies, depending upon the debonder or debonder mixture that is selected. TPnB alone decreases the tensile strength the most, while DPnB and mixtures with DPnB seem to be equally effective as debonders. In FIG. 7C, the tensile strength varies as a function of the debonder mixture. TPnB mixed in a 35:65 ratio with monopropylene glycol diacetate (BP 213C) (PGDA) decreases tensile load as much as TPnB alone; the predominance of PGDA (low boiling point) would correlate with the fact that the heat/steam requirement or energy requirement to dry the pulp to a predetermined solids percent would not be substantially increased.

EQUIVALENTS

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

What is claimed:

1. A method for making a debonded paper sheet, comprising:
    preparing a volatile debonder formulation comprising at least one volatile debonder and water,
    applying the volatile debonder formulation to a paper precursor to form a debonded paper precursor, wherein the volatile debonder formulation is applied to the paper precursor in an amount effective to reduce hydrogen bonding of the cellulose fibers of the paper precursor, and
    processing the debonded paper precursor through a papermaking machine, wherein the processing comprises a drying step, and wherein the volatile debonder evaporates from the debonded paper precursor during the drying step, without leaving debonder residua when detected using thermogravimetric mass spectrometry, thereby forming the debonded paper sheet,
    wherein the debonded paper sheet does not comprise a debonder that includes both a quaternary ammonium salt and a hydrophobic chain; and
    wherein the volatile debonder is a glycol ether.

2. The method of claim 1, wherein the volatile debonder formulation comprises at least two volatile debonders, each having a different boiling point.

3. The method of claim 2, wherein the at least two volatile debonders comprise a first volatile debonder having a higher molecular weight and a second volatile debonder having a lower molecular weight.

4. The method of claim 1, wherein the step of preparing the volatile debonder formulation comprises preparing an emulsion that disperses the volatile debonder formulation in the paper precursor.

5. The method of claim 1, wherein the step of applying the volatile debonder formulation to the paper precursor comprises mixing the volatile debonder formulation with the paper precursor before the drying step.

6. The method of claim 5, wherein the step of mixing the volatile debonder formulation with the paper precursor comprises forming an azeotropic mixture.

7. The method of claim 1, wherein the step of applying the volatile debonder formulation to the paper precursor comprises spraying or topically applying the volatile debonder to the paper web.

8. The method of claim 1, wherein the volatile debonder is selected from the group consisting of an ethylene glycol ether, tripropylene glycol n-butyl ether, tripropylene glycol methyl ether, propylene glycol n-butyl ether and dipropylene glycol n-butyl ether.

9. The method of claim 8, wherein the glycol ether is tripropylene glycol n-butyl ether.

10. The method of claim 1, wherein the glycol ether is an ethylene glycol ether selected from the group consisting of ethylene glycol monomethyl ether, ethylene glycol monoethyl ether, ethylene glycol monopropyl ether, ethylene glycol monoisopropyl ether, ethylene glycol monobutyl ether, ethylene glycol monobenzyl ether, ethylene glycol methyl ether acetate, ethylene glycol monethyl ether acetate and ethylene glycol monobutyl ether acetate.

11. The method of claim 1, wherein the water and the at least one volatile debonder form an azeotropic mixture that evaporates during the drying step.

12. A method for making a debonded paper sheet without debonder residua, comprising:
adding at least one volatile debonder to a paper precursor to form a debonded paper precursor, wherein the at least one volatile debonder is added in an amount effective to reduce hydrogen bonding of the cellulose fibers of the paper precursor and wherein the at least one volatile debonder is evaporable during a drying step without leaving debonder residua when detected using thermogravimetric mass spectrometry; and
processing the debonded paper precursor through a paper-making machine, wherein the processing comprises a drying step, thereby evaporating the at least one volatile debonder without leaving debonder residua when detected using thermogravimetric mass spectrometry, and thereby making the debonded paper sheet without debonder residua when detected using thermogravimetric mass spectrometry; and
wherein the debonded paper sheet does not comprise a debonder that includes both a quaternary ammonium salt and a hydrophobic chain; and
wherein the volatile debonder is a glycol ether.

13. The method of claim 12, further comprising adding a second volatile debonder to the paper precursor, wherein the second volatile debonder is evaporable during the drying process without leaving debonder residua when detected using thermogravimetric mass spectrometry.

14. The method of claim 13, wherein the at least one volatile debonder and the second volatile debonder have different boiling points.

15. The method of claim 14, wherein one of the at least one volatile debonder and the second volatile debonder has a lower molecular weight, and the other of the first volatile debonder and the second volatile debonder has a higher molecular weight.

16. The method of claim 12, wherein the at least one volatile debonder is selected from the group consisting of an ethylene glycol ether, tripropylene glycol n-butyl ether, tripropylene glycol methyl ether, propylene glycol n-butyl ether and dipropylene glycol n-butyl ether.

17. The method of claim 16, wherein the glycol ether is tripropylene glycol n-butyl ether.

18. The method of claim 12, wherein the glycol ether is an ethylene glycol ether selected from the group consisting of ethylene glycol monomethyl ether, ethylene glycol monoethyl ether, ethylene glycol monopropyl ether, ethylene glycol monoisopropyl ether, ethylene glycol monobutyl ether, ethylene glycol monobenzyl ether, ethylene glycol methyl ether acetate, ethylene glycol monethyl ether acetate and ethylene glycol monobutyl ether acetate.

* * * * *